April 7, 1942.  W. S. CLARKSON  2,278,830
FLUID METER
Filed May 31, 1940   4 Sheets-Sheet 1

Inventor
William S. Clarkson,
By
Attorneys

April 7, 1942.    W. S. CLARKSON    2,278,830
FLUID METER
Filed May 31, 1940    4 Sheets-Sheet 3

Inventor
William S. Clarkson,
By
Attorneys

April 7, 1942.   W. S. CLARKSON   2,278,830
FLUID METER
Filed May 31, 1940   4 Sheets-Sheet 4
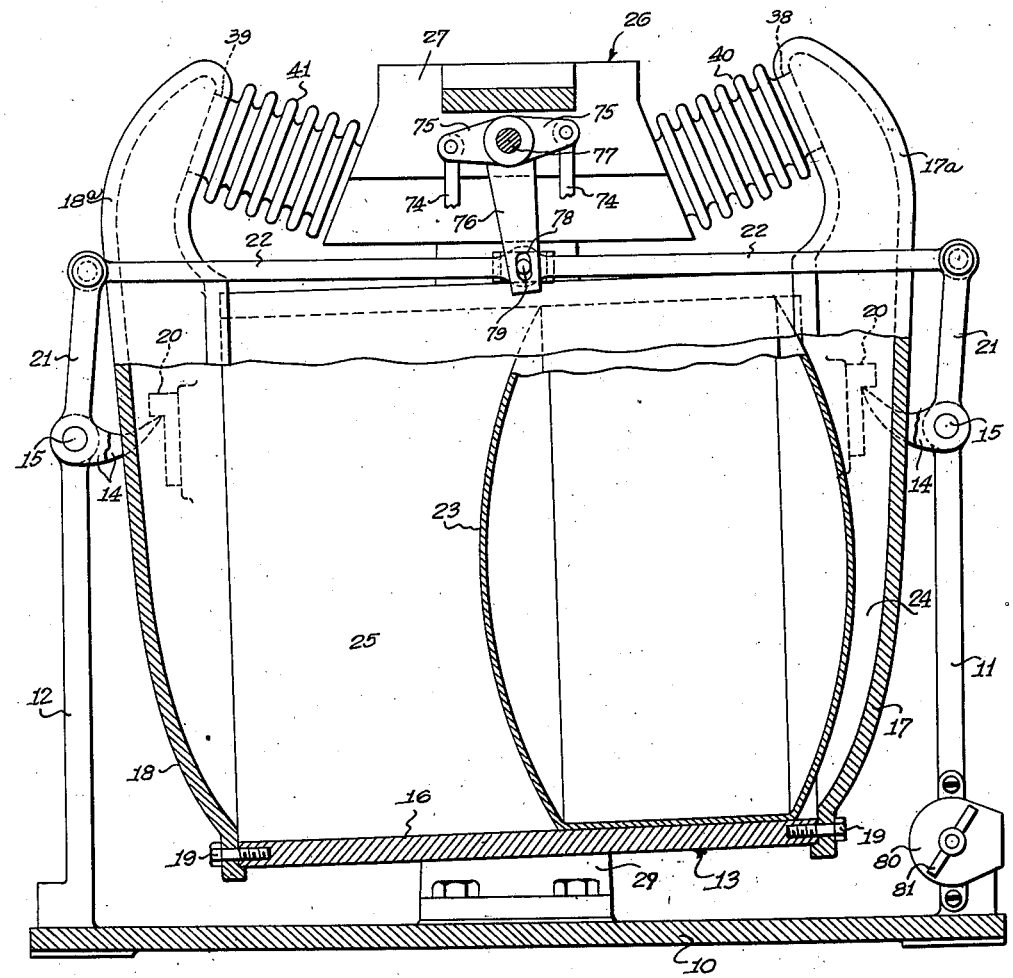
Fig. 5.
Inventor
William S. Clarkson,
By
Attorneys Patented Apr. 7, 1942

2,278,830

UNITED STATES PATENT OFFICE 2,278,830

FLUID METER

William S. Clarkson, Ann Arbor, Mich.

Application May 31, 1940, Serial No. 338,014

9 Claims. (Cl. 73—241)

This invention relates generally to meters and more particularly to fluid weight meters.

It is an object of the present invention to provide a new and improved fluid weight meter having a container which is tiltable in response to a differential of fluid weight in chambers on opposite sides of a piston in the container to control operation of a valve which controls flow of fluid into and out of the chambers.

Another object of the invention resides in the provision of yieldable resistance means opposing tilting of the container to determine the fluid weight differential necessary to cause tilting of the container.

Another object of the invention is to provide a new and improved liquid weight meter so constructed as to prevent trapping of gas bubbles or air in the above mentioned container.

This invention consists in the improved construction and combination of parts, to be more fully described hereinafter, and the novelty of which will be particularly pointed out and distinctly set forth in the appended claims.

In the drawings:

Fig. 5 is a side view in elevation having certain parts broken away and in section.

Figure 1:
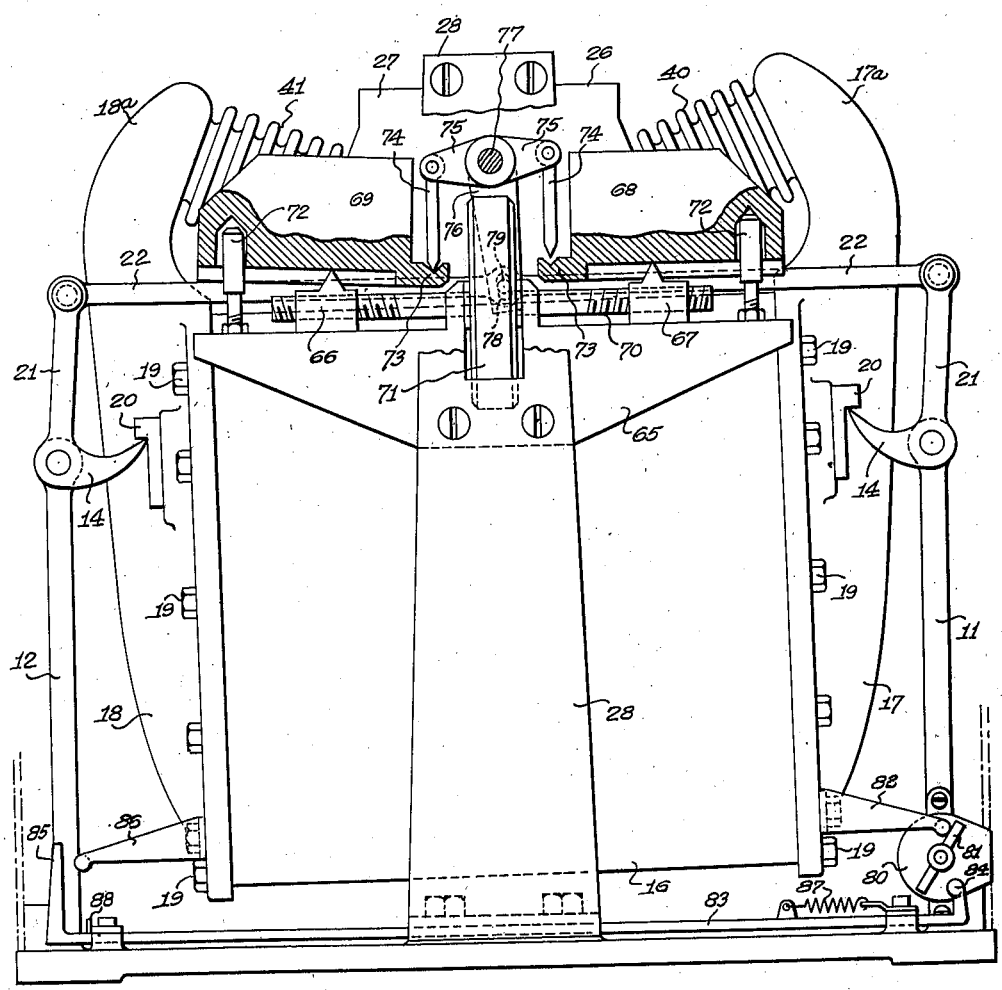
Fig. 1 is a side view of the fluid meter having parts broken away and in section to show certain structural details.
Figure 2:
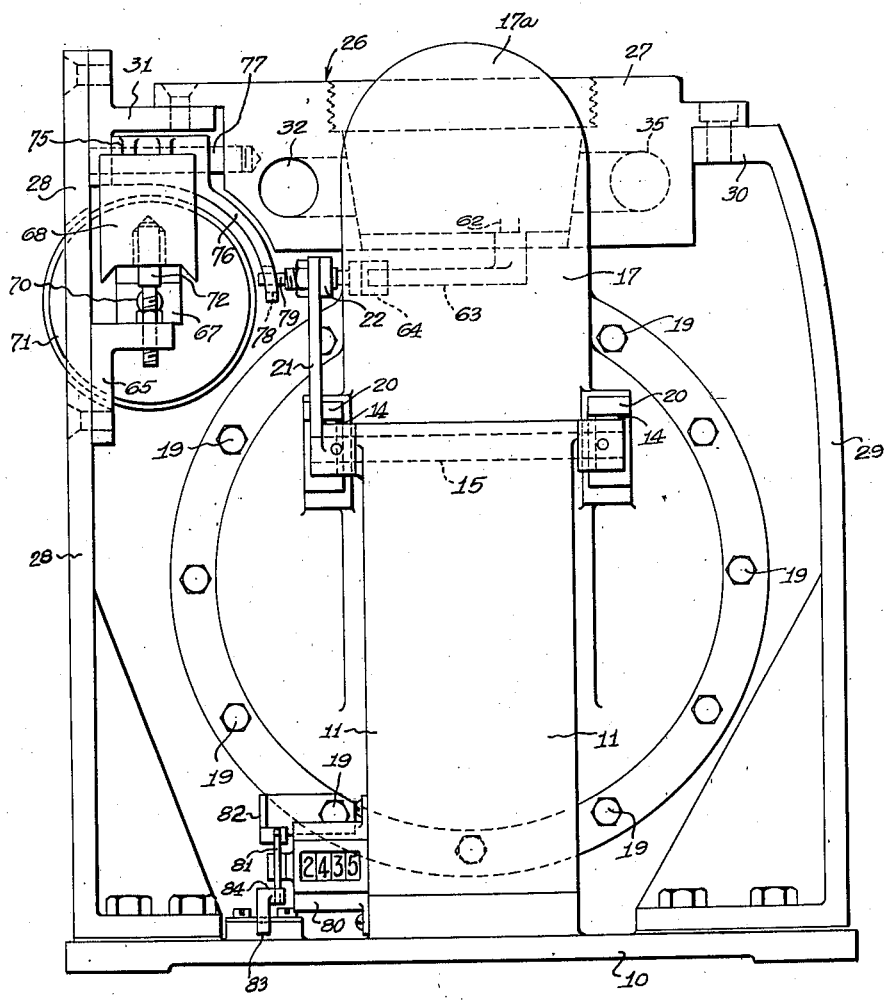
Fig. 2 is an end view of the meter looking from right to left of Fig. 1.

The fluid meter shown in the drawings includes a base 10 of rectangular shape on which is mounted adjacent the opposite ends thereof, upright supports 11 and 12 which may be welded or rigidly secured to the base 10 by any suitable means. Positioned between the uprights 11, 12 and extending longitudinally of and above the base plate 10, a container or cylinder 13 is tiltably mounted or suspended by movable fulcrum members 14 which are pivoted to and adjacent the upper ends of the uprights 11, 12. On each of the uprights 11, 12 there is preferably a pair of the movable fulcrum members 14 for each end of the container, the fulcrum member of each pair being spaced transversely of the container 13 and being fixed or secured to transverse shafts 15 which are rotatably mounted respectively in bores in the upper ends of the uprights 11, 12. The container 13 preferably is of sectional construction comprising a central, open ended section or cylinder 16 and removable, like end walls or headers 17 and 18. Screws 19 or other suitable means may be provided for rigidly securing the cylinder walls 17 and 18 to the central cylinder section 16. The movable fulcrum members 14 are in the form of levers having free, preferably pointed ends which engage respectively in socket members 20 which are secured to the opposite container end walls 17 and 18 in recesses provided therein, the socket members 20 preferably being disposed above the longitudinal axis of the container 13. One of the fulcrum members 14 of each pair is provided with an upwardly extending arm 21, and these arms 21 are pivotally connected together by a connecting member or rod 22 which extends longitudinally of the container, providing for movement of the pairs of fulcrum members together and in the same direction so that the container 13 will at all times be supported by both pairs of the movable fulcrum members 14.

Within the container 13 there is a hollow piston 23 which is preferably made of a light weight material, and this piston 23 divides the interior of the container 13 into two expansible end chambers 24 and 25. A valve, designated in general by the numeral 26, controls fluid flow into and out of the expansible chambers 24 and 25, the valve 26 being mounted in a casing 27 above the container 13, substantially midway between the ends thereof. Rigidly secured to the base 10, a pair of spaced upright supports 28 and 29 are provided between which the container 13 extends, the uprights 28 and 29 extending above the container and supporting the valve casing 27. As is more clearly shown in Fig. 4, the upright 29, at its upper end, is provided with an inturned flange 30, and to the other upright 28 is rigidly secured a bracket 31, the flange 30 and the bracket 31 providing seating surfaces for the valve casing 27 which may be rigidly secured in place by screws or by other suitable means.

Figure 3:
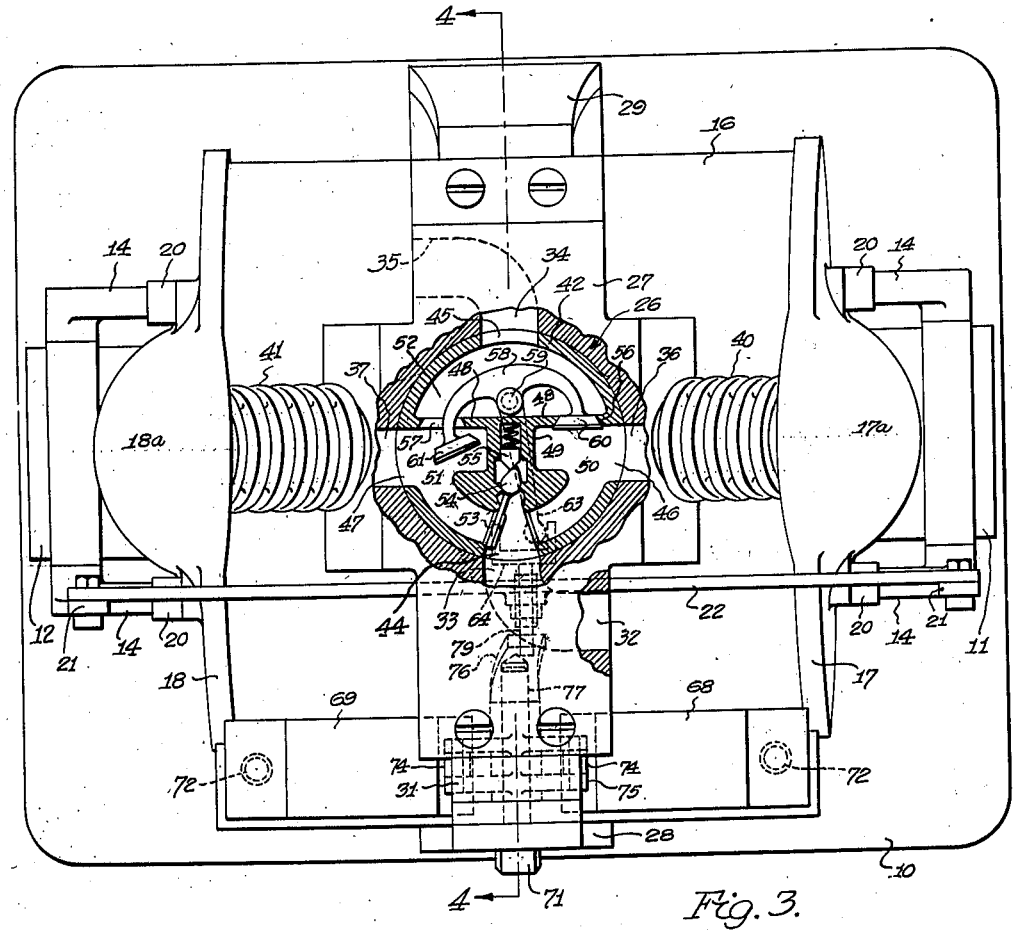
Fig. 3 is a top view of the meter showing certain parts broken away and in section.

The valve casing 27, see Fig. 3, is provided with a fluid inlet 32 which may be connected to a fluid supply line or pipe, and this inlet 32 leads into the casing 27 through an inlet port 33. Opposite the inlet port 33, the casing 27 is provided with an outlet port 34 of an outlet passage 35 from which fluid, having been measured by the meter, is discharged. Also, the valve casing 27 is provided with oppositely disposed flow passages 36 and 37 which communicate respectively with the expansible chambers 24 and 25 of the container. As shown, the end walls or cylinder header members 17 and 18 have hollow, upwardly extending portions 17a and 18a respectively which extend above the cylinder central section 16. These upwardly extending, hollow portions 17a and 18a provide chambers above the container 13 into which gases escape from the container instead of being trapped in the expansible chambers 24, 25, and, in addition, the gas gives a cushioning effect to smoothen the flow of the liquid. Eventually, excess gas in the upper chambers of the headers finds its way out of the meter via the valve 26. The opposed walls of the upper hollow portions 17a and 18a are angularly disposed, facing downwardly, and are provided with flow ports 38 and 39 respectively, Fig. 5, which are connected to the valve casing flow passages 36 and 37 respectively by bellows members 40 and 41, the valve casing passages 36 and 37 being below the ports 38 and 39 which permits tilting movement of the container 13 relative to the valve casing 27 with very slight resistance thereto by the bellows.

Figure 4:
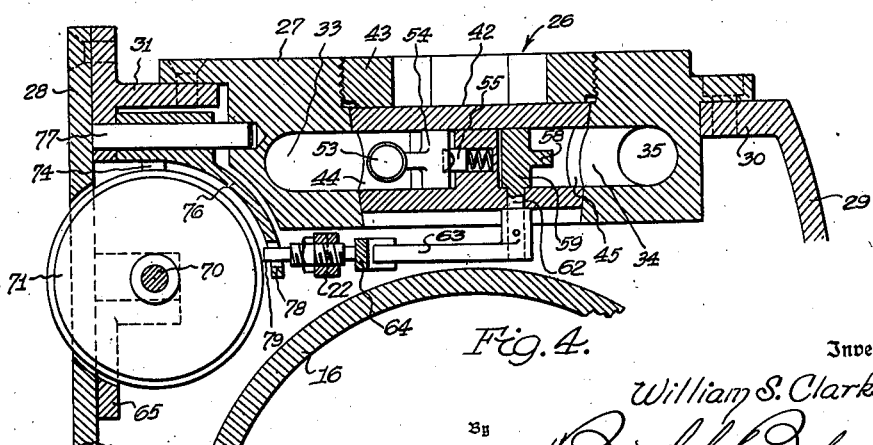
Fig. 4 is a fragmentary sectional view of the meter, taken along the line and in the direction of the arrows 4—4 of Fig. 3.

The valve 26 includes a hollow valve body 42 which fits into the valve casing 27 and may be held down in place by a screw 43, screwthreaded into the upper end of the valve casing, see Fig. 4. In the side wall of the valve body, oppositely disposed ports 44 and 45 register respectively with the casing inlet port 33 and the outlet port 34. Also, in the side wall of the valve body 42 are provided oppositely disposed ports 46 and 47 which register respectively with the flow ports 36 and 37 of the casing 27, see Fig. 3. An internal transverse wall 48, integral with the valve body 42 is provided with an integral wall portion 49 which extends transversely to and joins the wall 48 substantially centrally of the valve body, the wall 49 extending toward and terminating in spaced relation to the fluid inlet port 44. The internal walls 48 and 49 divide the interior of the valve body 42 into a pair of flow chambers 50 and 51 and into a chamber 52 which is a common outlet chamber for the flow chambers 50 and 51. The port 46 opens into the flow chamber 50, port 47 opens into the flow chamber 51, the port 44 is a common inlet to the chambers 50 and 51, and port 45 leads out of the outlet chamber 52. The chambers 50 and 51 are each provided with an inlet port which are opposed and communicate with the common valve body inlet 44, and a pressure responsive valve or vane member 53 is provided to control the ports to direct fluid flow alternately into the chambers 50 and 51. The valve member or vane 53 is secured at one end thereof to a shaft or pin 54 which is rotatably supported in the internal wall 49, the pin 54 having an extended or cam surface portion on its outer periphery cooperable with a spring pressed detent 55 for yieldingly holding the vane 53 against fluttering in one or the other of its positions. In the transverse internal wall 48 of the valve body 42, a pair of spaced ports 56 and 57, one on each side of the wall 49, connect the chambers 50 and 51 respectively with the common outlet chamber 52. A pressure responsive valve member 58, in the outlet chamber 52, is pivoted intermediate its ends to the valve body 42 by a pin or shaft 59, and on opposite ends of the valve member 58, within the chambers 50 and 51, are provided valve heads 60 and 61 for respectively controlling the valve ports 56 and 57. As shown in Fig. 3, the valve member 58 is adapted to close one of the ports 56, 57 and open the other of the ports for alternately establishing communication between the chambers 50, 51 and the outlet chamber 52.

Projecting externally of the valve body 42, through the bottom wall thereof, a reduced end portion 62 of the pivot pin 59 of the valve member 58 is fixed or secured to one end of a substantially horizontally extending lever arm 63, the other or free end of the arm 63 being positioned unattachedly between the spaced arms of a yoke member 64 which is secured to and moves with the fulcrum member connecting rod 22 longitudinally of the container 13. The valve member 58 and the yoke 64 are arranged such that in one position of the valve member 58 the free end of the operating arm 63 is in close proximity to one of the arms of the yoke 64 and when in the other position is in close proximity to the other arm of the yoke. Upon slight movement of the fulcrum member connecting rod 22, as the container 13 tilts, the yoke 64 will pivot the arm 63 to initiate movement of the valve member 58 which, after initial movement, will be operated by the fluid pressure with a snap action, this operation being more completely explained in the herein complete description of operation of the meter.

Rigidly secured to the upright 28, and extending longitudinally of the container 13, a supporting member 65 supports a pair of longitudinally spaced fulcrum members 66 and 67 on which are fulcrumed respectively a pair of longitudinally spaced weight members 68 and 69. These weight members 68 and 69, individually and alternately, oppose tilting of the container in opposite directions and thus determine the weight differential of fluid in the container expansible chambers 24 and 25, required to tilt the container 13. The fulcrum members 66 and 67 are slidably supported for longitudinal movement on the supporting member 65, toward and away from each other, to adjust the weight differential of fluid necessary to overcome the weight members or, in other words, to adjust the increment of fluid weight measured each time that the container tilts. The fulcrum members 66, 67 screwthread onto a rotatable screw 70 which extends longitudinally of the container 13 and is held against rectilinear movement, the screw 70 being rotatable conveniently by a hand wheel 71 to adjust the spacing of the fulcrum members. Rigidly secured to the supporting member 65, adjacent each end thereof, is an upwardly extending pin 72, these pins being provided preferably with upper pointed ends to engage respectively in bores or sockets of the weight members 68, 69. The pins 72 serve to limit downward movement of the outer ends of the weight members 68, 69 and also limit lateral movement of the weight members. At their inner ends, the weight members 68, 69 are provided with extended arm portions 73 having upwardly facing recesses or sockets to receive, respectively, the lower pointed ends of a pair of pins 74 which are pivotally connected at their upper ends to oppositely disposed arms 75 of a lever member 76. The lever member 76 is pivoted intermediate its oppositely extending arms 75 on a shaft 77 which is supported at one end thereof by the valve casing 27 and at the other end thereof by the bracket 31, see Fig. 4. The lever 76 extends downwardly between the weight members 68, 69 and adjacent its lower end is provided with a slot 78 to receive a pin 79 which is carried by the connecting rod 22, on the opposite side thereof from the yoke 64, to operate the lever 76. A counter 80 is provided to register the increment of liquid weight measured over a period of operation of the meter, and this counter may be of any suitable type. In the present instance, the counter has an operating arm 81 which is engaged and operated by an extension or arm 82 secured to the container end wall or header 17, the operating arm being returned to a neutral position by a spring (not shown). A reciprocal rod 83 extends longitudinally of the container 13, having one end 84 arranged to engage and operate the counter operating arm 81, the other end of the rod 83 having an upturned end portion 85 arranged to be engaged by an extension arm 86 carried by the container end wall 18. This provides for actuation of the counter 80 each tilting operation of the container, the rod 83 being returned to the position shown in Fig. 1 by a spring 87, limited by a stop member 88.

In Figs. 1 and 5, the container 13 is shown tilted, but it should be understood that the container has a neutral position in which its longitudinal axis is substantially horizontally disposed, and it further should be understood that in operation of the meter the chambers 24 and 25, the bellows 40 and 41 and the several passages of the valve 26 are completely filled with a gas or filled solid with a liquid, as the case may be.

*Operation*

With the parts in the positions shown in Figs. 1 and 5, and assuming that a liquid is being metered, the liquid forced into the chamber 25 has moved the piston 23 to the right, discharging fluid from the chamber 24, the left end of the container having tilted downwardly by reason of the differential in weight of the fluid in the chambers 24 and 25. When the left end of the container tilts downwardly, the adjacent movable fulcrum members 14 are pivoted in a clockwise direction facing Figs. 1 and 5, and the right hand fulcrum members 14 are also pivoted in a clockwise direction, by reason of the fulcrum connecting member or rod 22, so that both of the pairs of fulcrum members 14 remain in contact with their respective container socket members 20 at all times. This tilting of the container 13 with accompanying movement of the fulcrum members 14 and their connecting rod 22 occurs when the weight differential of fluid in the container chambers 24 and 25 is such that it overcomes the resistance or opposing force of the weight member 69. When the left end of the container 13 tilts downwardly, the connecting rod 22 of the fulcrum members 14 moves to the right, facing Figs. 1 and 5, and pivots lever 76 in a counterclockwise direction which, acting on the left pin 74, pivots the weight member 69 on its fulcrum 66 in a clockwise direction, the right hand pin being moved upward clear of its socket in the weight member 68. Also, when the connecting rod 22 moves to the right, Figs. 1, 3, and 5, the yoke 64 carried thereby engages the free end of the lever 63 to initiate movement of the valve member 58 shown in Fig. 3, closing port 56 and opening port 57. After slight movement of the valve member 58 by the yoke 64, the fluid pressure in the valve chamber 50, acting against the valve head 60, pivots the valve member 58 with a quick or snap action, closing port 56 and opening port 57. This sudden closing of the outlet port 56 of the flow passage or chamber 50 causes an increase in pressure in the chamber 50 which overcomes the spring pressed detent 55 and moves the inlet valve or vane 53 with a snap action to the position shown in Fig. 3, this action of the vane being aided by the decrease in pressure in chamber 51, due to the opening of its outlet port 57. With the outlet valve member 58 and the inlet valve member 53 in the positions shown in Fig. 3, fluid flows through the valve inlet 44, chamber 50, passages 46, 36, bellows 40, into the right end container chamber 24, and moves the piston 23 to the left. As the piston 23 moves to the left, facing Figs. 1 and 5, it discharges fluid from the left hand chamber 25, the fluid flowing from the container head 18, down through the bellows 41, through passages 37, 47, chamber 51, outlet port 57, into outlet chamber 52, whence the fluid leaves the meter through the outlet 35. As the piston 23 moves toward the left end of the container 13, the weight of the fluid in the chamber 25 decreases, accompanied by increase of fluid weight in the other chamber 24 and, when the fluid weight differential becomes equal to the force due to the weight member 69, the container 13 will assume a neutral position in which the longitudinal axis of the container 13 will be substantially horizontal, and both pins 74 will engage in their respective sockets in the weight members 68, 69. When the piston 23 has moved to the left such that the fluid weight differential in the chambers 24 and 25 exceeds the force due to weight member 68, then the container 13 will tilt in a clockwise direction, facing Figs. 1 and 5. Upon tilting of the container 13 in a clockwise direction, its fulcrums 14 are pivoted, moving the connecting rod 22 thereof to the left, and the yoke 64 engages the arm 63 and initiates movement of the outlet valve member 58. This initial movement of the valve member 58 unseats valve head 60, opening the outlet port 56, thus reducing the pressure in the chamber 50 and the fluid pressure acting against the valve head continues movement of the valve to close port 57 and fully open port 56. The closing of the port 57 causes an increase in pressure in chamber 51 which together with the decrease in pressure in chamber 50 causes the inlet valve to move with a snap action to open chamber 51 to the inlet 44 and to close chamber 50 to the inlet 44, the spring pressed detent 55 acting to hold the valve 53 against fluttering action. The outlet valve member 58 and the inlet valve member 53 act substantially simultaneously. By means of the adjustment wheel 71, the weight fulcrum members 66, 67 may be movably adjusted toward or away from each other. This adjustment of the fulcrum members 66, 67 changes the lever arms of the weight members 68, 69, respectively, and consequently changes the opposing forces of the weight members to tilting of the container 13. Thus, by adjusting or changing the position of the fulcrum members 66, 67, the fluid weight differential in the container chambers 24 and 25 necessary to tilt the container will be changed accordingly which provides for regulating the weight increment of fluid measured each time that the container tilts. On tilting, the container 13 operates the counter or indicator to indicate the number of increments of fluid metered over a period of time. When the container 16 tilts counter-clockwise, facing Figure 1, the member 82 carried by the container engages and rotates the indicator operating member 81. When the container 16 tilts in a clockwise direction, the member 86 engages and moves the member 85 to the left, which shifts the rod 83 to the left such that the abutment 84 thereon engages and moves the operating member 81. The spring 87 then shifts the rod 83 to the right to return the abutment 85 to its former position.

What I claim is:

1. In a fluid weight meter, supporting means, an elongated tiltable container, a pair of fulcrum members for and spaced apart longitudinally of said container, a piston in said container providing expansible chambers on opposite sides of said piston, fluid inlet and outlet means for said chambers, valve means operatively connected to and disposed above said container on said supporting means and operable responsive to the tilting of said container to control said inlet and said outlet means of said pair of chambers, said valve means alternately opening one of said chambers to ingress of fluid to move said piston and to open the other of said chambers for egress of fluid therefrom by said piston, said container alternately tilting on said fulcrum members by and in accordance with a differential in fluid weight in said chambers and controlling operation of said valve means, and a pair of weight members operable for opposing the tilting of said container.

2. In a fluid weight meter, a tiltable elongated container, a pair of fulcrum members for and spaced longitudinally of said container, a piston in said container providing expansible chambers therein on opposite sides of said piston, inlet and outlet means for each of said chambers, fluid pressure responsive valve means controlling said inlet and said outlet means, said valve means being operable to direct fluid alternately into and out of said chambers to move said piston in opposite directions, said container being tiltable alternately on said fulcrums by and upon a predetermined differential in weight of fluid in said chambers, means to initiate operation of said pressure responsive valve means and actuated by tilting of said container, and a pair of movable weight members operatively connected to said valve means to oppose tilting of said container.

3. In a fluid weight meter, an elongated container, a pair of fulcrum members supporting said container adjacent opposite ends thereof, a piston in said container and dividing the interior thereof into a pair of expansible chambers at opposite ends of said piston, inlet and outlet means for one of said chambers, inlet and outlet means for the other of said chambers, valve means controlling said first-named inlet and outlet means and said second-named inlet and outlet means, said valve means operating to direct fluid alternately into and out of said chambers, said container alternately tilting in opposite directions by and in accordance with a predetermined fluid weight differential in said pair of chambers and operable to control said valve means, means operatively connecting said container and said valve means to initiate operation of said valve means responsive to tilting of said container, and a pair of movable weight members operatively connected to said valve means to oppose tilting of said container.

4. In a fluid weight meter, a container, spaced apart movable fulcrum members for said container, a piston in said container dividing the interior thereof into a pair of expansible chambers at opposite ends of the piston, said container being rockable alternately in opposite directions by and in accordance with a predetermined fluid weight differential in said chambers, yieldable means opposing rocking of said container by said fluid weight differential and operatively connected to said movable fulcrum members, inlet and outlet means for one of said chambers, inlet and outlet means for the other of said chambers, valve means for controlling said first-named inlet and outlet means and for controlling said second-named inlet and outlet means, said valve means being operable to direct fluid alternately into and out of said chambers and operatively connected to and actuated by tilting of said container.

5. In a fluid weight meter, a container, spaced apart movable fulcrum members for said container, a piston in said container dividing the interior thereof into a pair of expansible chambers at opposite ends of the piston, said container being rockable alternately in opposite directions by and in accordance with a predetermined fluid weight differential in said chambers, yieldable means opposing rocking of said container by said fluid weight differential and operatively connected to said movable fulcrum members, inlet and outlet means for one of said chambers, inlet and outlet means for the other of said chambers, valve means for controlling said first-named inlet and outlet means and for controlling said second-named inlet and outlet means, said valve means being operable to direct fluid alternately into and out of said chambers, and means operatively connecting said valve means and said movable fulcrum members.

6. In a fluid weight meter, a container, spaced apart pivoted fulcrum members for said container, a piston in said container dividing the interior thereof into expansible chambers on opposite sides of said piston, an inlet and outlet port for one of said chambers above said piston, an inlet and outlet port for the other of said chambers and disposed above said piston, valve means operable to direct fluid flow alternately into said chambers and disposed above said piston, said valve means having inlet and outlet ports, bellows members connecting the inlet and outlet ports of said chambers to the inlet and outlet ports of said valve means, said container being tiltable by and upon a fluid weight differential in said chambers and pivoting said fulcrum members, yieldable means opposing pivoting of said fulcrum members, means operatively connecting said fulcrum members and said yieldable means, and means operatively connecting said fulcrum members and said valve means.

7. In a fluid weight meter, an elongated container, pivoted fulcrum members supporting said container adjacent opposite ends thereof for tilting movement in opposite directions, a pair of spaced apart fulcrum members, supporting means for said second-named fulcrum members, a pair of weight members fulcrumed respectively and arranged to be individually pivoted on said second-named fulcrum members, said weight members respectively opposing tilting of said container in opposite directions, means operatively connecting said weight members respectively to said pivoted fulcrum members, a piston in said container dividing the interior thereof into a pair of expansible chambers on opposite sides of said piston, inlet and outlet means for each of said chambers, valve means operable to control said inlet and outlet means of each chamber for alternately directing flow of fluid into said chambers, said container tilting by and upon a predetermined fluid weight differential in said chambers determined by said weight members and actuating said valve means, and means operatively connecting said valve means and said container.

8. In a fluid weight meter, a tiltable container, a piston in said container dividing the interior thereof into expansible chambers on opposite sides of the piston, inlet and outlet means for each of said chambers, valve means controlling the inlet and outlet means of each chamber and operable to direct fluid flow alternately into said chambers, supporting means, fulcrum members for said container and pivoted to said supporting means, said fulcrum members being spaced longitudinally of the direction of movement of said piston, said container being tiltable by and upon a predetermined weight of fluid in said chambers, a connecting member connecting said fulcrum members, force exerting means yieldingly opposing tilting of said container, means operatively connecting said connecting member, force exerting means and said valve means.

9. In a fluid weight meter, a tiltable container, a piston in said container dividing the interior thereof into a pair of expansible chambers, inlet and outlet means for each of said chambers, valve means controlling the inlet and outlet means of each of said chambers and operable to direct fluid flow alternately to said chambers, supporting means, fulcrum members pivoted on said supporting means and supporting said container for tilting movement, said fulcrum members being spaced apart longitudinally of the direction of movement of said piston, a connecting member connecting said fulcrum members together, a pair of spaced weight members disposed above said container and respectively opposing tilting of said container in opposite directions, adjustable fulcrum members for said weight members, said container being tiltable by and upon a predetermined differential in weight of fluid in said chambers determined by said adjustable fulcrum members, a movable member loosely associated with and operable to initiate operation of said valve means, means operatively connecting said connecting member and said movable member, and means operatively connecting said weight members individually to said connecting member.

WILLIAM S. CLARKSON.